Aug. 6, 1957  J. C. J. EVENBLIJ  2,801,946
METHOD OF MAKING CONTAINERS OF GLASS FIBER
MAT PROVIDED WITH END CLOSURES
Filed Nov. 22, 1954

United States Patent Office 2,801,946
Patented Aug. 6, 1957

2,801,946
METHOD OF MAKING CONTAINERS OF GLASS FIBER MAT PROVIDED WITH END CLOSURES

Johan Carl Julius Evenblij, Koog an den Zaan, Netherlands

Application November 22, 1954, Serial No. 470,405

5 Claims. (Cl. 154—83)

My invention relates to improvements in the manufacture of containers or barrels formed from glass fibre mat impregnated or sprayed with plastic.

It is an object of my invention to simplify the manufacture of such containers and more especially of barrels adapted for the transport of oil products or the like, which are provided with bottoms with an upstanding flange and with a hole for the screw bung.

Another object of my invention is a practical method for manufacturing the bottoms of such barrels out of the same material as that of the barrel body, to wit plastic reinforced with glass fibre mat.

A further object of my invention is a manner of manufacture of said bottoms whereby the bung hole is pressed simultaneously with the bottom.

A still further object of my invention is an easy method for cutting the screw thread for the screw bung in the walls of the bung hole during the pressing of the bottom.

These and other objects of my invention will become apparent as the disclosure proceeds.

Although the characteristic features of my invention will be particularly pointed out in the claims, my invention itself, and the manner in which it may be carried out, may be better understood by referring to the following description taken in connection with the accompanying drawings forming a part thereof, in which:

Figures 1, 2, 3 and 4 schematically show the succession steps for manufacturing a barrel according to my invention.

Figure 1:
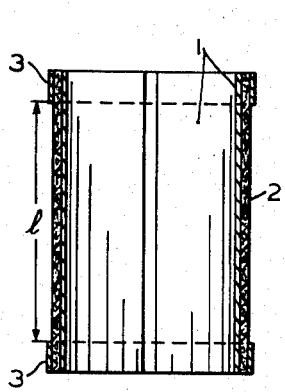
Figure 2:
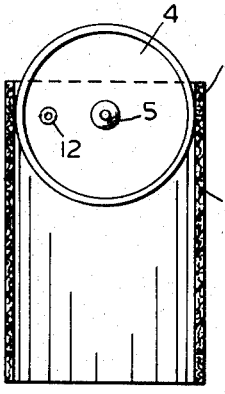
Figure 3:
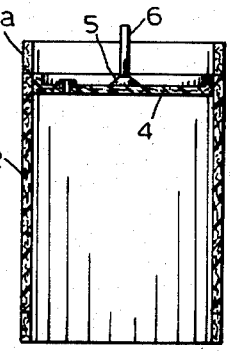
Figure 4:
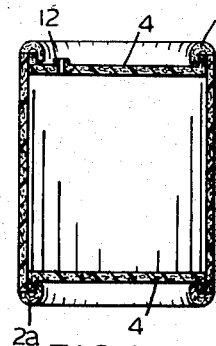

In Figure 1 a cylindrical, detachable mould is indicated by 1. Around this mould a mat 2 of glass fibre material is bent until the longitudinal edges abut or slightly overlap each other. The upper and lower cylindrical edges of the bent mat are covered by strips 3, after which the mat is sprayed with plastic over the length 1 in Figure 1. After the plastic has been set or hardened and the mould 1 has been removed, according to Figure 2 a barrel-bottom 4, in its vertical position is slid into the barrel body beyond the not-sprayed, vulnerable glass fibre edge 2a and is then tilted over into the horizontal closing position. This sliding in and tilting of the bottom can be managed with the aid of a sucking disc 5 with a short handle 6 or by other means.

Hereafter the not-sprayed glass fibre edge 2a is bent over the upstanding flange 4a of the bottom 4 and is sprayed with plastic.

After the plastic has been hardened, the bottom is solidly connected to the barrel body.

Figures 5, 6, 7:
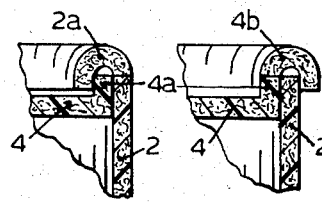
Figure 5 shows a detail of Figure 4 on an enlarged scale.
Figures 6 and 7 show two different modifications of the method according to my invention.

In a second modification of my method the cylindrical glass fibre mat on the mould is sprayed over its total surface, after which the plastic is allowed to harden. In this hardened barrel body a hardened bottom 4 is placed, the upstanding hardened flange 4a of said bottom being extended with a not-sprayed edge 4b of glass fibre mat, which edge is bent over the barrel body 2 (Figure 6). Now the edge 4b is sprayed with plastic which is allowed to harden, whereby a strong connection of the bottom to the barrel body is obtained.

In Figure 7 a third modification of my method is shown. According to this modification a separate strip 7 of glass fibre mat is bent over the hardened barrel body 2 and over the flange 4a of the hardened bottom and is sprayed with plastic.

It will be obvious, that also the second bottom of the barrel can be connected to the barrel body in the manner described.

Figure 8:
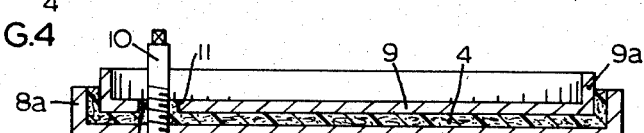
Figure 8 shows a preferred method for making the barrel-bottoms.

Figure 8 shows a preferred method for making the bottoms with upstanding flange and screw bung hole, from the same material as that of the barrel body.

A piece of glass fibre mat of the required dimensions, which has been sprayed or impregnated with plastic, is pressed between an outer mould 8 with upstanding flange 8a and an inner mould 9 with upstanding flange 9a, if desired under the application of heat.

A core 10 in the shape of a screw bolt is screwed into the outer mould 8, which core is provided with screw-thread over a part of its length. The inner mould 9 has a hole 11 coaxially with the core, said hole having a larger diameter than the core. In the screwed-in position of the core 10, in which the smooth part of the core will extend above the outer mould 8, the mat piece provided with a pre-formed hole is placed over the core on the outer mould 8, after which the inner mould is placed and the bottom 4 is pressed, simultaneously pressing the upstanding wall 12 of the bung hole. When now the screw core 10 is screwed out, the thread on the core cuts the screw thread for the screw bung in the wall of the bung hole.

The invention claimed is:

1. A method of making plastic impregnated glass fiber containers which comprises the steps of bending a glass fiber mat around a movable cylindrical mould and bringing the longitudinal edges of the mat into edge-abutting relationship, spraying the central portion of the resulting glass fiber cylindrical mat while said mat is supported by the mould with a plastic but leaving the end portions of said mat free from said plastic, allowing the plastic to harden in the mat, removing the mould from the resulting plastic-impregnated glass fiber cylinder, placing in said cylinder an end closure member formed from a plastic impregnated glass fiber mat, said end closure member having a peripheral flange engageable with the interior surface of said cylinder, said flange being directed away from the interior of the cylinder, bending one of the plastic-free end portions of said cylinder over said flange, spraying said last-named end portion with said plastic, allowing the plastic to harden, and closing the other end of said cylinder in like manner with a second like end closure member.

2. A method of making plastic impregnated glass fiber containers which comprises the steps of bending a glass fiber mat around a movable cylindrical mould and bringing the longitudinal edges of the mat into edge-abutting relationship, spraying the central portion of the resulting glass fiber cylindrical mat while said mat is supported by the mould with a plastic but leaving the end portions of said mat free from said plastic, allowing the plastic to harden in the mat, removing the mould from the resulting plastic-impregnated glass fiber cylinder, placing in said cylinder an end closure member formed from a plastic impregnated glass fiber mat by sliding the member in vertical position into the cylinder end beyond said end portion of said cylinder and tilting the member into the horizontal closing position, said end closure member having a peripheral flange engageable with the interior surface of said cylinder, said flange being directed away from the interior of the cylinder, bending one of the plastic-free end portions of said cylinder over said flange, spraying said last-named end portion with said plastic, allowing the plastic to harden, and closing the other end of said cylinder in like manner with a second like end closure member.

3. A method of making plastic impregnated glass fiber containers which comprises the steps of bending a glass fiber mat around a movable cylindrical mould and bringing the longitudinal edges of the mat into edge-abutting relationship, spraying the resulting glass fiber cylindrical mat while said mat is supported by the mould with a plastic, allowing the plastic to harden in the mat, removing the mould from the resulting plastic-impregnated glass fiber cylinder, placing in said cylinder an end closure member formed from a glass fiber mat, said end closure member having a plastic-impregnated web portion and a peripheral flange engageable with the interior surface of said cylinder, said flange being directed away from the interior of the cylinder, bending said flange of said bottom member over the adjacent edge of said cylinder, spraying said flange with said plastic, allowing the plastic to harden, and closing the other end of said cylinder in like manner with a second like end closure member.

4. A method of making plastic impregnated glass fiber containers which comprises the steps of bending a glass fiber mat around a movable cylindrical mould and bringing the longitudinal edges of the mat into edge-abutting relationship, spraying the resulting cylindrical mat while said mat is supported by the mould with a plastic, allowing the plastic to harden in the mat, removing the mould from the resulting plastic-impregnated glass fiber cylinder, placing in said cylinder an end closure member formed from a plastic impregnated glass fiber mat, said end closure member having a preipheral flange engageable with the interior surface of said cylinder, said flange being directed away from the interior of the cylinder, bending a separate plastic-free element over said flange and over the adjacent edge of said cylinder, spraying said element with said plastic, allowing the plastic to harden, and closing the other end of said cylinder in like manner with a second like end closure member.

5. A method of making plastic impregnated glass fiber containers which comprises the steps of bending a glass fiber mat around a movable cylindrical mould and bringing the longitudinal edges of the mat into edge-abutting relationship, spraying at least the central portion of the resulting glass fiber cylindrical mat while said mat is supported by the mould with a plastic, allowing the plastic to harden in the mat, removing the mould from the resulting plastic-impregnated glass fiber cylinder, placing in said cylinder an end closure member formed from a plastic impregnated glass fiber mat, said end closure member having a peripheral flange engageable with the interior surface of said cylinder, said flange being directed away from the interior of the cylinder, bending a plastic-free glass fiber element to interengage said bottom member with said cylinder, spraying said element with said plastic, allowing the plastic to harden, and closing the other end of said cylinder in like manner with a second like end closure member.

References Cited in the file of this patent

UNITED STATES PATENTS

| | | |
|---|---|---|
| 1,806,943 | Koch et al. | May 26, 1931 |
| 2,041,357 | Kraft | May 19, 1936 |
| 2,108,910 | Walter | Feb. 22, 1938 |
| 2,285,220 | Morrell | June 2, 1942 |
| 2,314,338 | Graves et al. | Mar. 23, 1943 |
| 2,393,347 | Stuart et al. | Jan. 22, 1946 |
| 2,433,643 | Beach et al. | Dec. 30, 1947 |
| 2,452,357 | Collins | Oct. 26, 1948 |
| 2,462,940 | Bowes | Mar. 1, 1949 |
| 2,555,380 | Stuart et al. | June 5, 1951 |
| 2,588,604 | Archer | Mar. 11, 1952 |
| 2,601,266 | Ducatman et al. | June 24, 1952 |
| 2,623,680 | Wilcox | Dec. 30, 1952 |
| 2,649,392 | Marshall | Aug. 18, 1953 |